(12) United States Patent
Wang et al.

(10) Patent No.: US 7,242,160 B2
(45) Date of Patent: Jul. 10, 2007

(54) STARTING METHOD FOR HALL-LESS SINGLE-PHASE BLDCM

(75) Inventors: Weizi Wang, Shanghai (CN); Zhigan Wu, Shanghai (CN); Wanbing Jin, Shanghai (CN); Jianping Ying, Shanghai (CN); Lijian Wu, Shanghai (CN); Shih-Ming Huang, Taoyuan Shien (TW); Wen-Shi Huang, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 78 days.

(21) Appl. No.: 11/284,018

(22) Filed: Nov. 21, 2005

(65) Prior Publication Data

US 2006/0220602 A1    Oct. 5, 2006

(30) Foreign Application Priority Data

Mar. 29, 2005    (TW) .............................. 94109894 A (51) Int. Cl.
*H02K 21/00*        (2006.01)

(52) U.S. Cl. ...................... 318/254; 318/439; 318/138; 318/521; 318/505; 388/928.1

(58) Field of Classification Search ................ 318/254, 318/138, 439, 521, 505; 388/928.1, 806, 388/815
See application file for complete search history.

(56) References Cited

U.S. PATENT DOCUMENTS

2003/0231875 A1* 12/2003 Masino .................... 388/928.1
2004/0189231 A1*  9/2004 Peterson ..................... 318/439

OTHER PUBLICATIONS

S. Bentouati, Z.Q. Zhu and D. Howe, "Permanent Magnet Brushless DC Motors For Consumer Products" (http://mag-net.ee.umist.ac.uk/reports/P11/p11.html), printed Oct. 28, 2005.

* cited by examiner

*Primary Examiner*—Karen Masih
(74) *Attorney, Agent, or Firm*—Volpe and Koenig PC

(57) ABSTRACT

The methods for starting a Hall-less single-phase BLDCM having an asymmetrical air gap are proposed. The provided methods are employed to input a specific amount of current impulse and stop the current impulse at a specific time such that the rotor of the single-phase BLDCM having an asymmetrical air gap can be realized to rotate in the pre-determined direction through one of the cogging torque and the rotor inertia after that specific time so as to accomplish the normal starting of a motor without the Hall-effect sensor.

20 Claims, 6 Drawing Sheets

(a) Position 1

(b) Position 2

(a) Tapered-air gap (b) Stepped-teeth (c) Asymmetric-teeth (d) Notched-teeth

STARTING METHOD FOR HALL-LESS SINGLE-PHASE BLDCM

FIELD OF THE INVENTION

The present invention relates to the control of a single-phase brushless DC motor (BLDCM). More particularly, the present invention relates to the starting method for a Hall-less single-phase BLDCM having an asymmetrical air gap.

BACKGROUND OF THE INVENTION

The single-phase BLDCM is widely used in low starting torque and small power fields such as pumps, blowers and cooling fans. The single-phase BLDCM requires a suitable current commutation signal synchronized with the rotor position for proper operation. In most applications, a Hall-effect position sensor is used to detect the rotor position and control the motor. However, the Hall-effect sensor itself increases the size of the motor system and the manufacturing costs. Besides, the Hall-effect sensor decreases the capability of the system against the environment variation, e.g., the temperature variation. Many Hall-less BLDCM drives that detect the rotor position have been introduced.

The single-phase motors have null-points in their torque waveforms, which make them difficult to start sometimes. To overcome this problem, an asymmetrical air gap is employed to introduce a reluctance torque component. FIGS. 1(a) to 1(d) shows some typical models of this kind. A paper, S. Bentouati, Z. Q. Zhu and D. Howe, "Permanent Magnet Brushless DC Motors For Consumer Products", The European Network for Permanent Magnet Devices Report (<http://mag-net.ee.umist.ac.uk/reports/P11/p11.html>), has proved that tapered-air gap is the best configuration among the above-mentioned models according to cogging torque peak value. The motors involved in the present invention adopt this kind of asymmetrical air gap to overcome their starting null-points.

Most of these applications require the motor to rotate in one predetermined direction. But the direction control becomes very difficult when the system is running in sensorless mode, more clearly in Hall-less mode, because the controller cannot determine the rotor's initial position. During the motor's starting procedure, the controller should solve this problem firstly.

Keeping the drawbacks of the prior arts in mind, and employing experiments and research full-heartily and persistently, the applicants finally conceived a starting method for a Hall-less single-phase BLDCM. This invention is mainly about how to solve the above-mentioned problem. A novel method is introduced to make the motor start up from standstill to rotating in a preferred direction.

SUMMARY OF THE INVENTION

It is therefore an object of the present invention to propose a starting method for a Hall-less single-phase BLDCM having an asymmetrical air gap such that the BLDCM at standstill could be rotated in the required direction.

It is therefore another object of the present invention to input a specific amount of current impulse and stop the current impulse at a specific time such that the rotor of the single-phase BLDCM having an asymmetrical air gap can be realized to rotate in the pre-determined direction through one of the cogging torque and the rotor inertia after that specific time so as to accomplish the normal starting of a motor without the Hall-effect sensor.

According to the first aspect of the present invention, the method for starting a brushless DC motor (BLDCM) having a stator, a rotor, a winding and an asymmetrical air gap, wherein the stator has a specific tooth and the rotor has a specific magnetic pole, includes the steps of: (a) exciting the winding with a current impulse such that the stator generates a magnetic field and then going to one of steps (b) and (d); (b) driving the rotor to rotate in a first direction with the current impulse if a polarity of a portion of the specific tooth of the stator close to the air-gap and a polarity of the specific magnetic pole of the rotor corresponding to the specific tooth are opposite and then going to step (c); (c) stopping the current impulse at a specific moment such that the rotor is rotated in a second direction by a cogging torque and then going to step (f); (d) driving the rotor to rotate in a specific direction with the current impulse if a polarity of a portion of the specific tooth of the stator close to the air-gap and a polarity of the specific magnetic pole of the rotor corresponding to the specific tooth are the same and then going to step (e); (e) stopping the current impulse at a specific time such that the rotor is rotated in the specific direction by an inertia and then going to step (f); and (f) detecting a back electromotive force (BEMF) in the winding when the rotor rotates such that the motor is controlled for commutating according to the BEMF.

Preferably, the brushless DC motor is a single-phase BLDCM.

Preferably, the second direction is one of a clockwise direction and a counterclockwise direction and is determined by a shape of the asymmetrical air gap.

Preferably, the current impulse is one of a positive current impulse and a negative current impulse.

Preferably, the current impulse is large enough to rotate the rotor.

Preferably, the rotor in step (b) is jittering between the first direction and the second direction within an acute angle after the rotor is driven by the current impulse to rotate in the first direction and the current impulse is maintained until the rotor is at standstill.

Preferably, the specific direction is the second direction.

Preferably, the rotor in step (b) is at standstill at the specific moment and the rotor in step (d) is still rotated in the second direction at the specific time.

Preferably, the first direction and the second direction are two opposite directions.

Preferably, a positive magnetic power is generated after the brushless DC motor is commutated.

Preferably, the brushless DC motor further includes a controller controlling the current impulse.

According to the second aspect of the present invention, the method for starting a BLDCM having a stator, a rotor and a winding includes the steps of: (a) exciting the winding with a current impulse such that the stator generates a magnetic field and then going to step (b); (b) driving the rotor to rotate in one of a first and a second directions with the current impulse and then going to step (c); (c) stopping the current impulse at a specific moment such that the rotor is rotated in the second direction by one of a cogging torque and an inertia, and then going to step (d); and (d) detecting a BEMF in the winding when the rotor rotates such that the motor is controlled for commutating according to the BEMF.

Preferably, the BLDCM further includes an asymmetrical air gap, and the second direction is one of a clockwise direction and a counterclockwise direction and is determined by a shape of the asymmetrical air gap.

Preferably, the current impulse is one of a positive current impulse and a negative current impulse.

Preferably, the current impulse is large enough to rotate the rotor.

Preferably, the stator further includes a specific tooth, the rotor further includes a specific magnetic pole, and the rotor in step (b) is rotated in the first direction and is at standstill at the specific moment if a polarity of the specific tooth and a polarity of the specific magnetic pole are opposite, and is rotated in the second direction and is still rotated in the second direction at the specific moment if the polarity of the specific tooth and the polarity of the specific magnetic pole are the same.

Preferably, the rotor in step (c) is rotated by the cogging torque if the polarity of the specific tooth and the polarity of the specific magnetic pole are opposite, and rotated by the inertia if the polarity of the specific tooth and the polarity of the specific magnetic pole are the same.

Preferably, the rotor in step (b) is jittering between the first direction and the second direction within an acute angle after the rotor is driven by the current impulse in the first direction and the current impulse is maintained until the rotor is at standstill.

Preferably, the first direction and the second direction are two opposite directions.

Preferably, a positive magnetic power is generated after the brushless DC motor is commutated.

The present invention may best be understood through the following descriptions with reference to the accompanying drawings, in which:

The present invention may best be understood through the following descriptions with reference to the accompanying drawings, in which:

DETAILED DESCRIPTION OF THE PREFERRED EMBODIMENT

As mentioned-above, four different structures of the single-phase BLDCM with asymmetrical air gap, the tapered air gap, the stepped-teeth, the asymmetrical-teeth and the notched-teeth as shown in FIGS. 1(a) to 1(d) respectively, can overcome the traditional null-points in motor torque waveform easily. When a single-phase BLDCM having an asymmetrical air gap keeps at standstill, the position of its rotor with respect to its stator has two possibilities, Position 1 and Position 2, as shown in FIGS. 2(a) and 2(b) respectively. That is, the polarity of the rotor pole aligned with the special stator tooth named A1, as shown in FIGS. 2(a) and 2(b), is either south pole labeled as S (as shown in FIG. 2(a)) or north pole labeled as N (as shown in FIG. 2(b)).

In the present invention, the proposed starting methods are analyzed according to the simplest motor model just with two stator teeth, A1 and A2, and two permanent magnet poles, N and S, as shown in FIGS. 2(a) and 2(b). Surely, the methods provided in the present invention are applicable to the structures having more than two stator teeth and more than two permanent magnet poles also.

Figure 1:
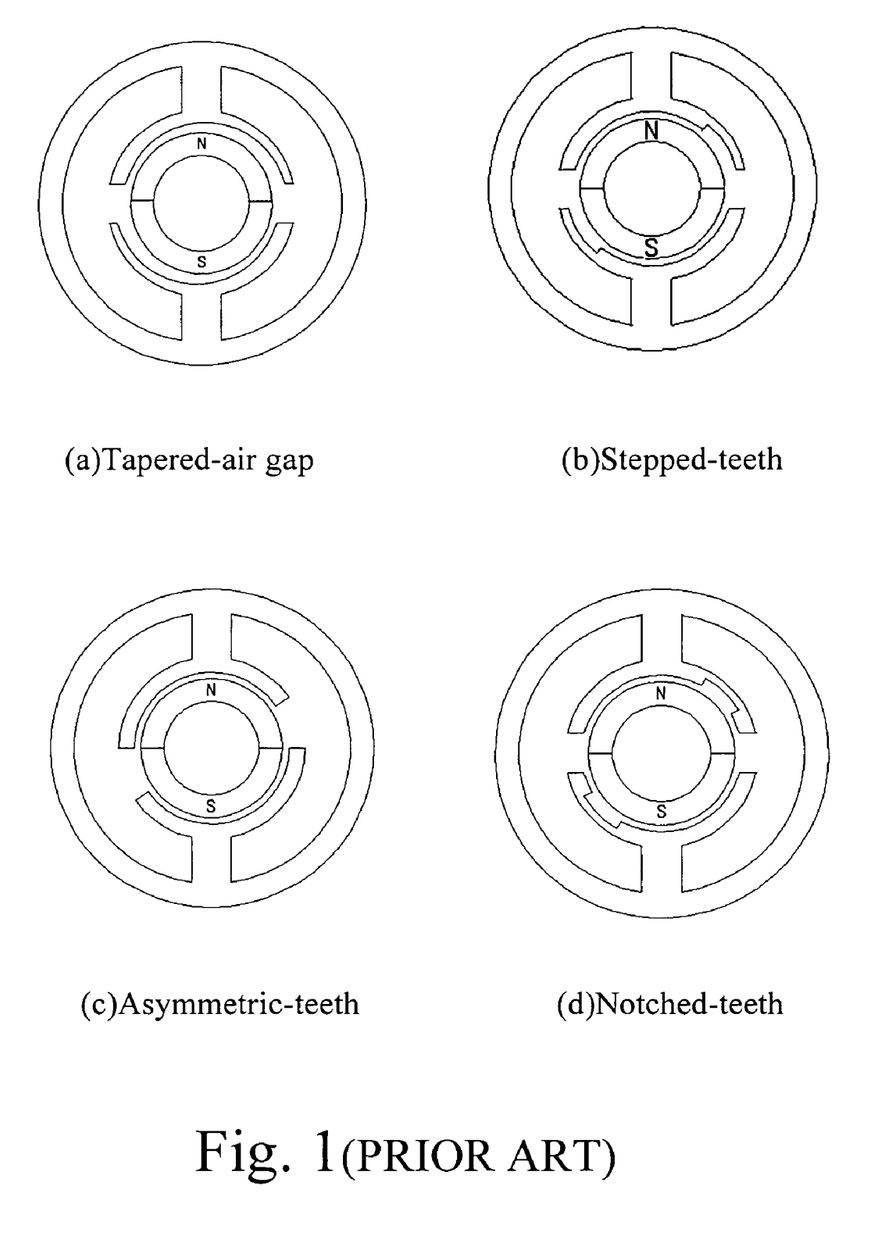
FIGS. 1(a) to 1(d) are respectively the schematic diagrams of the four different structures of the single-phase BLDCM having an asymmetrical air gap in the prior art, which are applicable to the present invention.
Figure 2:
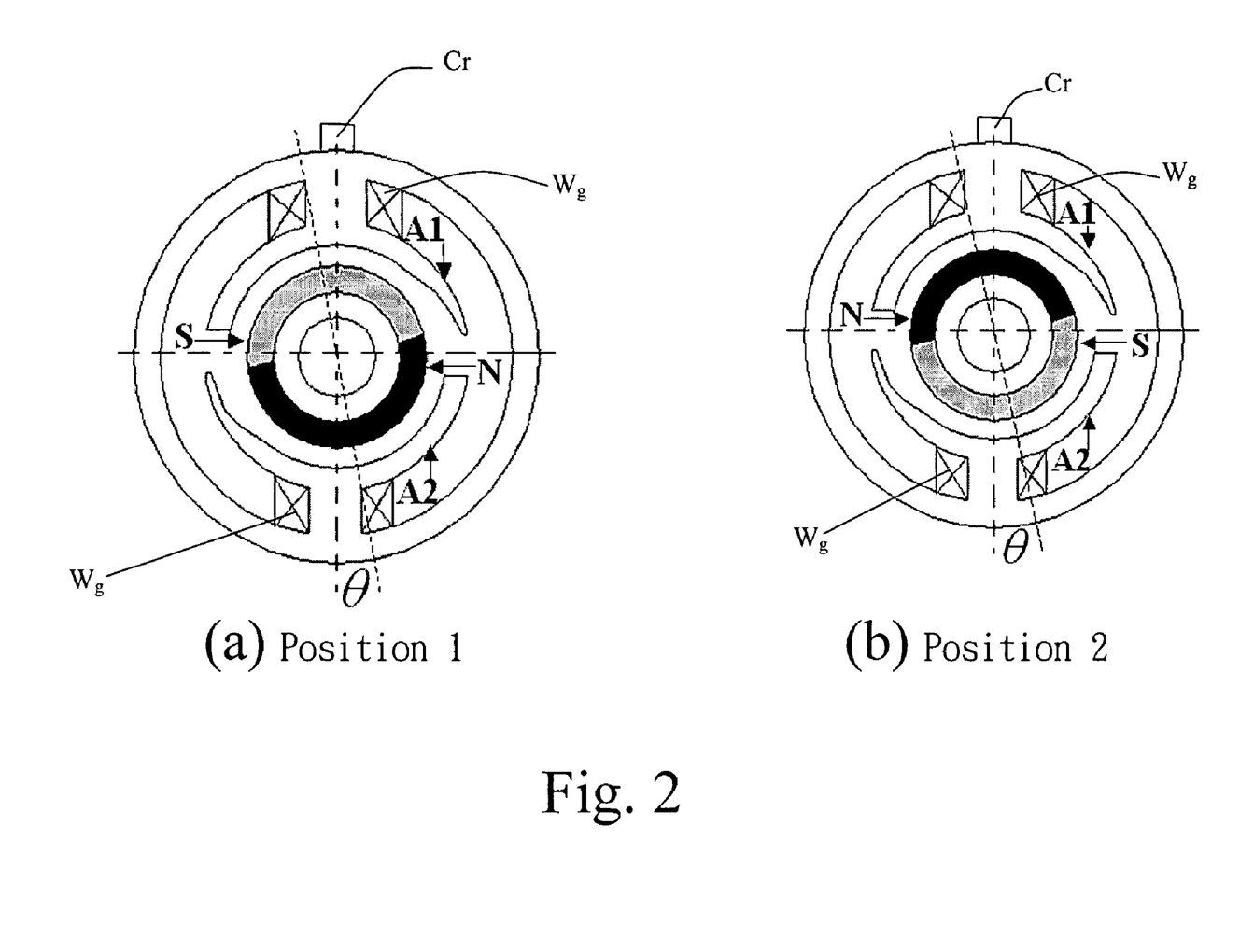
FIGS. 2(a) and 2(b) illustrate the two possible positions of a resting rotor of the single-phase BLDCM with asymmetrical air gap of the present invention respectively.
Figure 3:
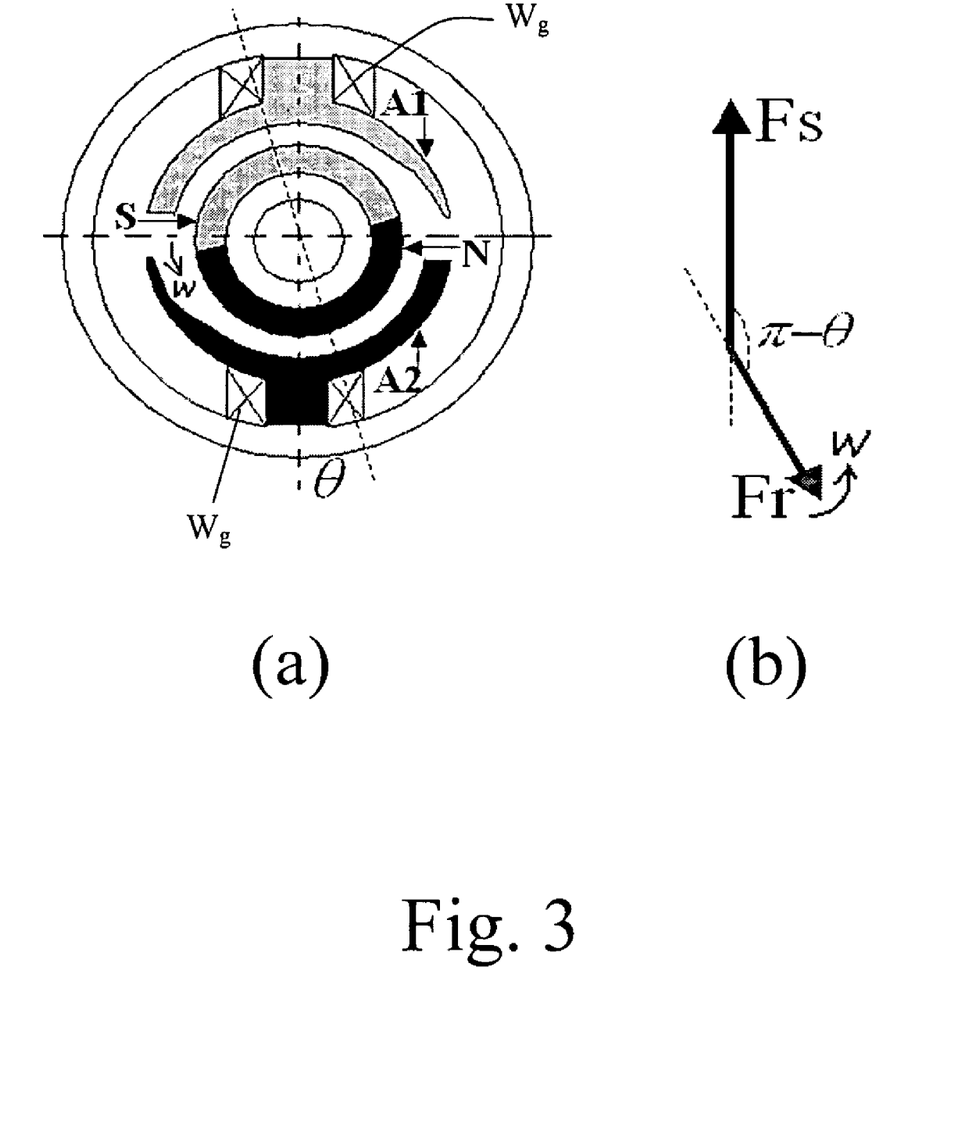
FIGS. 3(a) and 3(b) illustrate the single-phase BLDCM state with the rotor rotating in the counterclockwise direction and having the initial position as shown in FIG. 2(a), and the relationship between the two magnetic motive forces (MMFs) of the stator and the rotor respectively.
Figure 4:
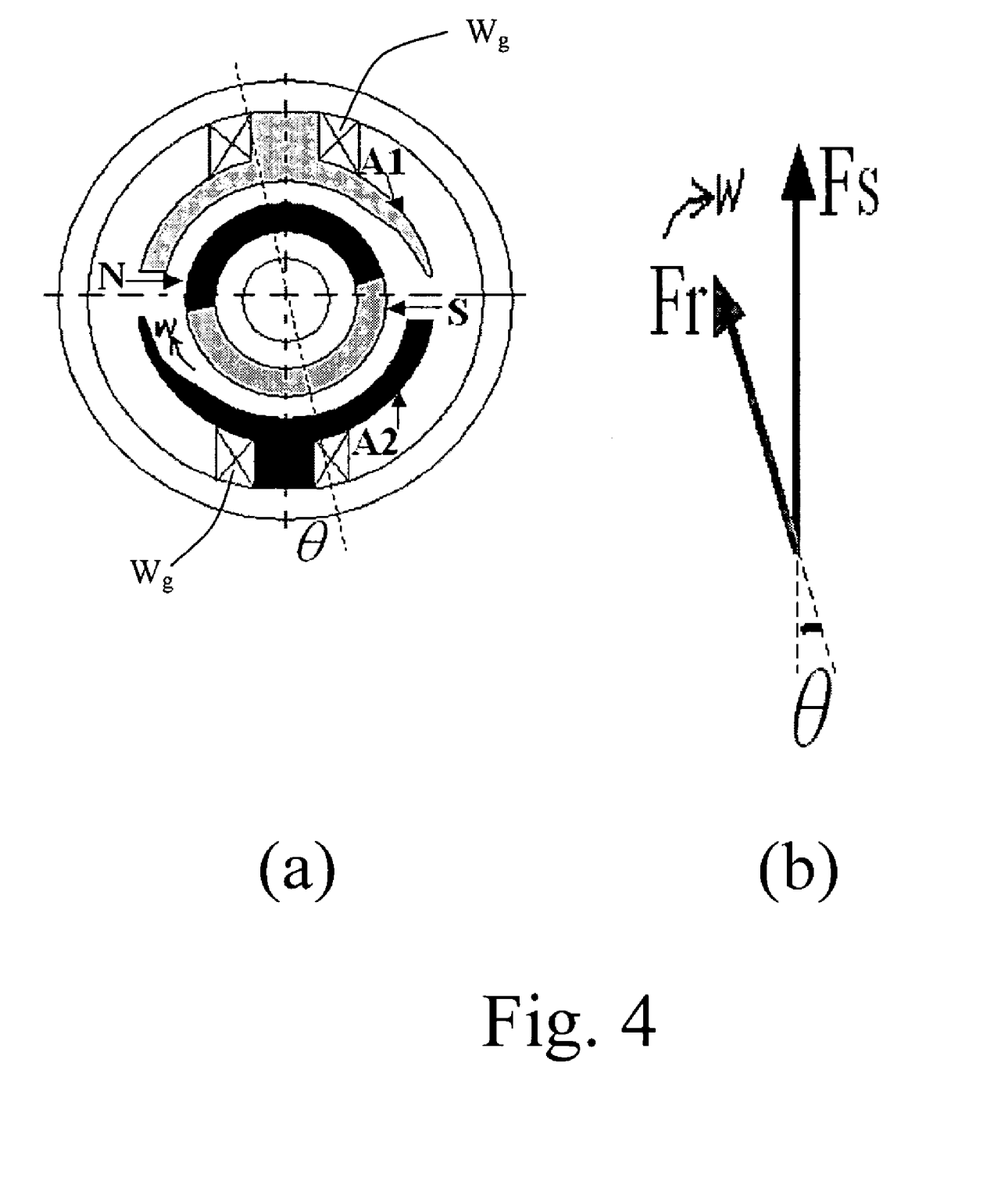
FIGS. 4(a) and 4(b) illustrate the single-phase BLDCM state with the rotor rotating in the clockwise direction and having the initial position as shown in FIG. 2(b), and the relationship between the two MMFs of the stator and the rotor respectively.
Figure 5:
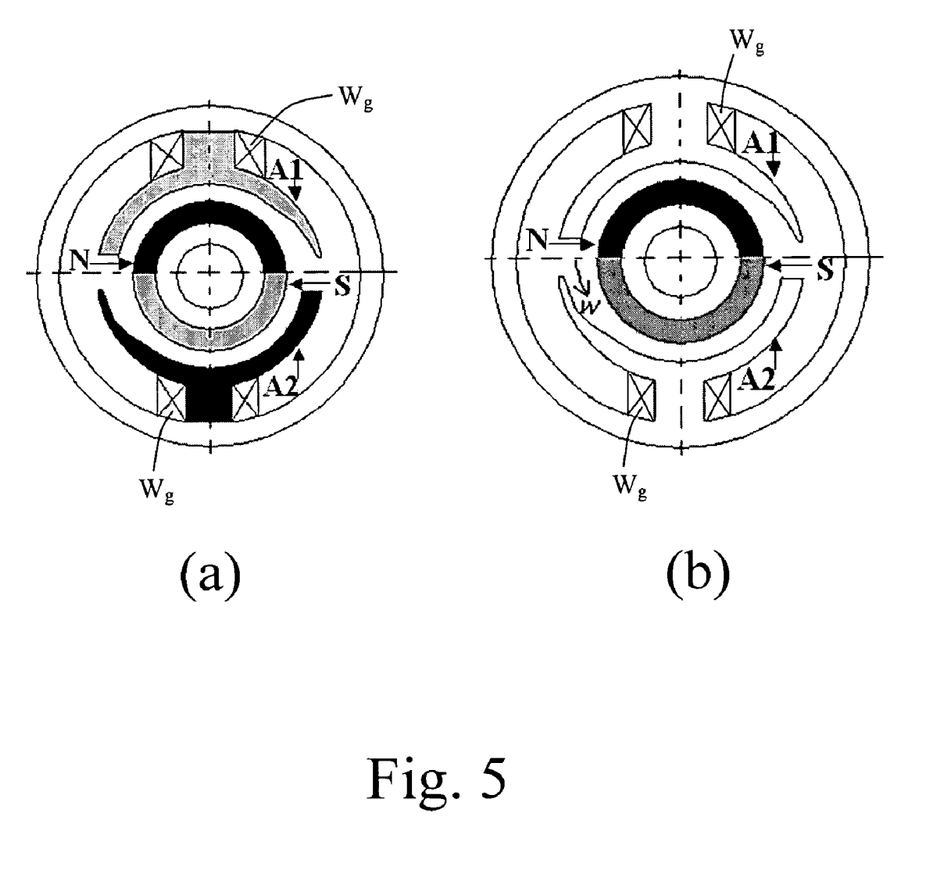
FIGS. 5(a) and 5(b) illustrate the single-phase BLDCM state having the rotor axis coincided with the stator axis and the rotor rotated in the counterclockwise direction with the initial position as shown in FIG. 5(a) respectively.

In FIGS. 2(a) and 2(b), Cr is a controller of the motor. Furthermore, the stator teeth of the motor model are labeled as A1 and A2, Wg is a winding of the motor, and the black portion represents the north pole N of the rotor/tooth A2 and the gray portion is the south pole S of the rotor/tooth A1 respectively as shown in FIGS. 2 to 5. Besides, it is assumed that the face towards the air gap of tooth A1 has the south polarity and the same of A2 has the north polarity while a positive current pulse is supplied to the winding Wg. Conversely, when a negative current pulse is supplied to the winding Wg, the color of A1 and A2 will be exchanged, that is, the polarity of the faces will be exchanged.

If a single-phase BLDCM has a sensor, for instance a Hall-effect sensor, which can get the information of polarity of the rotor pole, the single-phase BLDCM can give its driving strategy according to the information of the rotor and the required rotating direction easily. But if a single-phase BLDCM is based on the sensorless control and cannot get the information of the rotor when the rotor is at standstill, special methods should be adopted to realize the motor's start-up in the required direction. After the single-phase BLDCM based on the sensorless control is rotated in the desired direction, the single-phase BLDCM can be commutated successfully because it can get the information of the BEMF during the rotation of the rotor easily. So, the key issue of the proposed starting methods is to realize the motor start-up in the required direction.

Figure 6:
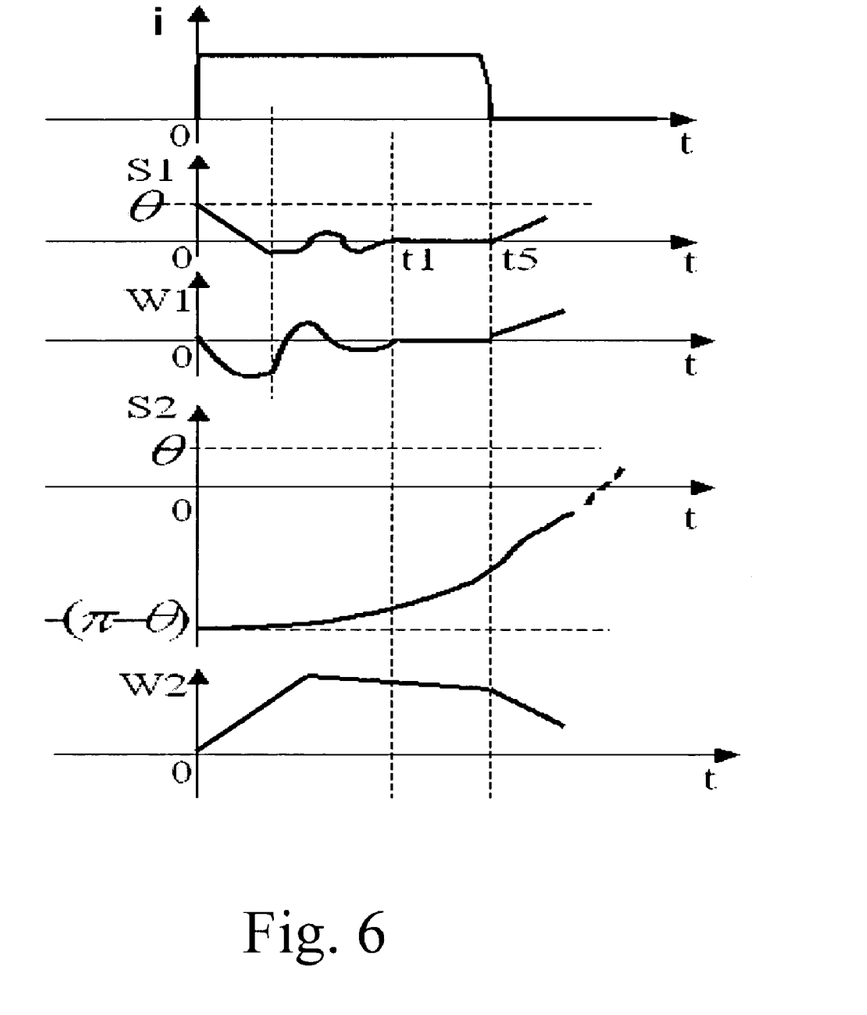
FIG. 6 is a graph illustrating the curves of current impulse, rotor position and rotor speed versus time respectively.

If the initial position of the rotor is Position 2 (as shown in FIG. 2(b)), FIG. 4(a) shows the motor state while a positive current impulse is supplied to the winding Wg. In FIG. 4(a), the rotor pole N and the tooth A1 have the opposite polarities. And the relationship between the magnetic motive force (MMF) of the stator Fs and the MMF of the rotor Fr is shown in FIG. 4(b). Obviously, the current impulse results in the clockwise rotation of the rotor. The current impulse keeps on, and the rotor will rotate an electrical angle of θ degrees. Then, the rotor stops at the special position (as shown in FIG. 5(a)) after jittering between the clockwise and the counterclockwise directions for a moment. As shown in FIG. 5(a), the polarities of the stator tooth (A1/A2) and the adjacent rotor pole (N/S) are opposite, and the rotor is attracted and positioned by the stator. If the controller Cr (as shown in FIGS. 2(a) and 2(b)) lets the current impulse drop to zero ampere suddenly at the next moment, the cogging torque will let the rotor rotate counterclockwise as shown in FIG. 5(b). FIG. 6 illustrates the curves of current impulse, rotor position and rotor speed versus time during this procedure. In FIG. 6, S1 is the rotor position curve, whose zero position is shown in FIG. 5(a), and W1 is the rotor speed curve. Please refer to FIG. 6, there is an electrical angle of θ degrees between the MMF of the stator Fs and the MMF of the rotor Fr at time 0 firstly. When the current impulse results in the clockwise rotation of the rotor, the electrical angle is decreased and finally become a negative value, which indicates that the rotor is rotated over the special position (as shown in FIG. 5(a)) and gone into the jittering phase, secondly. When the rotor jittering between the clockwise and the counterclockwise directions for a moment, the electrical angle is increased again to a positive peak value, then decreased to a negative peak value, and finally become zero degree at time t1 when the rotor stops at the special position (as shown in FIG. 5(a)) and the rotor axis coincides with the stator axis thirdly. The time t5 is the very moment that the current impulse drops to zero ampere suddenly and the rotation speed of the rotor with respect to the stator is zero at time t5 fourthly. After time t5, the cogging torque will let the rotor rotate counterclockwise (as shown in FIG. 5(b)) and the electrical angle is increased once again fifthly.

If the initial position of the rotor is Position 1 (as shown in FIG. 2(a)), FIG. 3(a) shows the motor state while a positive current impulse is supplied to the winding Wg. In FIG. 3(a), the rotor pole S and the tooth A1 have the same polarity. And the relationship between the MMF of the stator Fs and the MMF of the rotor Fr is shown in FIG. 3(b). Obviously, the current impulse results in the counterclockwise rotation of the rotor. The current impulse keeps on, and the rotor will rotate an electrical angle of (π−θ) degrees. Then, if the controller Cr (as shown in FIGS. 2(a) and 2(b)) lets the current impulse drop to zero ampere suddenly at the next moment, the rotor will keep moving counterclockwise (as shown in FIG. 5(b)) due to the rotor inertia. FIG. 6 illustrates the curves of current impulse, rotor position and rotor speed versus time during this procedure. In FIG. 6, S2 is the rotor position curve, whose zero position is shown in FIG. 5(a), and W2 is the rotor speed curve. Please refer to FIG. 6, there is an electrical angle of (π−θ) degrees between the MMF of the stator Fs and the MMF of the rotor Fr at time 0. When the rotor inertia results in the counterclockwise rotation of the rotor, the electrical angle is decreased gradually.

Thus, the rotor will keep on rotating in the counterclockwise direction no matter the initial position of the rotor is at Position 1 or at Position 2 after using a short positive current impulse for exciting the motor.

Similarly, after using a short negative current impulse for exciting the motor, the rotor will also keep on rotating in the counterclockwise direction in spite of the initial position of the rotor. The effect is the same as using a short positive current impulse. But the reasons are just exchanged. That is, here, the reason for the counterclockwise motion is the cogging torque when the initial position of the rotor is at Position 1, while the rotor inertia is the reason when the initial position of the rotor is at Position 2. In spite of the initial position of the rotor, the short negative current impulse also results in the rotor's rotation in the counterclockwise direction. Actually, the rotating direction is only determined by the structure of the asymmetrical air gap. If the left air gap is made larger than the right air gap under the stator tooth A1 and the right air gap is made larger than the left air gap under the stator tooth A2 (different from those of FIG. 2(a)), the rotor will run in the clockwise direction after the winding Wg (as shown in FIGS. 2(a) and 2(b)) is excited by the short current impulse.

After the short current impulse has succeeded in making the rotor run in the same direction with a speed, the controller Cr (as shown in FIGS. 2(a) and 2(b)) can realize the commutation by analyzing the information of the BEMF, which is observable only when the motor speed is not zero, and make the single-phase BLDCM output a positive magnetic power.

The key issues of the proposed methods are the time length and the magnitude of the current impulse. The criterion of the former is that the time period of applying the current impulse should be long enough for stopping the rotor at the special position (as shown in FIG. 5(a)) if the rotor initial position is at Position 2 (as shown in FIG. 2(b)). But at the same time, the time period of applying the current impulse cannot be too long to let the rotor stop at the special position if the initial position is at Position 1 (as shown in FIG. 2(a)). And the criterion of the latter is that the current impulse can drive the rotor rotating under the different rotor initial conditions. Obviously, different motor needs different current impulse for starting.

In conclusion, the proposed methods of the present invention are meant to input a specific amount of current impulse and stop the current impulse at a specific time such that the rotor of the single-phase BLDCM having an asymmetrical air gap can be realize to rotate in the pre-determined direction through the cogging torque or the rotor inertia after that specific time so as to accomplish the normal starting of a motor without the Hall-effect sensor.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A method for starting a brushless DC motor (BLDCM) having a stator, a rotor, a winding and an asymmetrical air gap, wherein said stator has a specific tooth and said rotor has a specific magnetic pole, comprising the steps of:
    (a) exciting said winding with a current impulse such that said stator generates a magnetic field and then going to one of steps (b) and (d);
    (b) driving said rotor to rotate in a first direction with said current impulse if a polarity of a portion of said specific tooth of said stator close to said air-gap and a polarity of said specific magnetic pole of said rotor corresponding to said specific tooth are opposite and then going to step (c);
    (c) stopping said current impulse at a specific moment such that said rotor is rotated in a second direction by a cogging torque and then going to step (f);
    (d) driving said rotor to rotate in a specific direction with said current impulse if a polarity of a portion of said specific tooth of said stator close to said air-gap and a polarity of said specific magnetic pole of said rotor corresponding to said specific tooth are the same and then going to step (e);
    (e) stopping said current impulse at a specific time such that said rotor is rotated in said specific direction by an inertia and then going to step (f); and
    (f) detecting a back electromotive force (BEMF) in said winding when said rotor rotates such that said motor is controlled for commutating according to said BEMF.

2. The method according to claim 1, wherein said brushless DC motor is a single-phase BLDCM.

3. The method according to claim 1, wherein said second direction is one of a clockwise direction and a counterclockwise direction and is determined by a shape of said asymmetrical air gap.

4. The method according to claim 1, wherein said current impulse is one of a positive current impulse and a negative current impulse.

5. The method according to claim 1, wherein said current impulse is large enough to rotate said rotor.

6. The method according to claim 1, wherein said rotor in step (b) is jittering between said first direction and said second direction within an acute angle after said rotor is driven by said current impulse to rotate in said first direction and said current impulse is maintained until said rotor is at standstill.

7. The method according to claim 1, wherein said specific direction is said second direction.

8. The method according to claim 1, wherein said rotor in step (b) is at standstill at said specific moment and said rotor in step (d) is still rotated in said second direction at said specific time.

9. The method according to claim 1, wherein said first direction and said second direction are two opposite directions.

10. The method according to claim 1, wherein a positive magnetic power is generated after said brushless DC motor is commutated.

11. The method according to claim 1, wherein said brushless DC motor further comprises a controller controlling said current impulse.

12. A method for starting a brushless DC motor (BLDCM) having a stator, a rotor and a winding, comprising the steps of:
(a) exciting said winding with a current impulse such that said stator generates a magnetic field and then going to step (b);
(b) driving said rotor to rotate in one of a first and a second directions with said current impulse and then going to step (c);
(c) stopping said current impulse at a specific moment such that said rotor is rotated in said second direction by one of a cogging torque and an inertia, and then going to step (d); and
(d) detecting a back electromotive force (BEMF) in said winding when said rotor rotates such that said motor is controlled for commutating according to said BEMF.

13. The method according to claim 12, wherein said brushless DC motor further comprises an asymmetrical air gap, and said second direction is one of a clockwise direction and a counterclockwise direction and is determined by a shape of said asymmetrical air gap.

14. The method according to claim 12, wherein said current impulse is one of a positive current impulse and a negative current impulse.

15. The method according to claim 12, wherein said current impulse is large enough to rotate said rotor.

16. The method according to claim 12, wherein said stator further comprises a specific tooth, said rotor further comprises a specific magnetic pole, and said rotor in step (b) is rotated in said first direction and is at standstill at said specific moment if a polarity of said specific tooth and a polarity of said specific magnetic pole are opposite and is rotated in said second direction and is still rotated in said second direction at said specific moment if said polarity of said specific tooth and said polarity of said specific magnetic pole are the same.

17. The method according to claim 16, wherein said rotor in step (c) is rotated by said cogging torque if said polarity of said specific tooth and said polarity of said specific magnetic pole are opposite, and rotated by said inertia if said polarity of said specific tooth and said polarity of said specific magnetic pole are the same.

18. The method according to claim 12, wherein said rotor in step (b) is jittering between said first direction and said second direction within an acute angle after said rotor is driven by said current impulse in said first direction and said current impulse is maintained until said rotor is at standstill.

19. The method according to claim 12, wherein said first direction and said second direction are two opposite directions.

20. The method according to claim 12, wherein a positive magnetic power is generated after said brushless DC motor is commutated.

* * * * *